US010272979B2

(12) United States Patent
Duckworth et al.

(10) Patent No.: US 10,272,979 B2
(45) Date of Patent: Apr. 30, 2019

(54) SYSTEM AND METHOD FOR SUBSEA PROPULSION AND ENERGY HARVESTING USING CURRENT SHEAR

(71) Applicant: Raytheon BBN Technologies, Corp., Cambridge, MA (US)

(72) Inventors: Gregory Duckworth, Cambridge, MA (US); William Coney, Cambridge, MA (US); Yevgeniy Dorfman, Cambridge, MA (US)

(73) Assignee: Raytheon BBN Technologies, Corp., Cambridge, MA (US)

( * ) Notice: Subject to any disclaimer, the term of this patent is extended or adjusted under 35 U.S.C. 154(b) by 0 days.

(21) Appl. No.: 15/096,191

(22) Filed: Apr. 11, 2016

(65) Prior Publication Data

US 2016/0297506 A1    Oct. 13, 2016

Related U.S. Application Data

(60) Provisional application No. 62/145,186, filed on Apr. 9, 2015.

(51) Int. Cl.
*B63G 8/00* (2006.01)
*B63G 8/08* (2006.01)
(Continued)

(52) U.S. Cl.
CPC ................ *B63G 8/08* (2013.01); *B63J 3/04* (2013.01); *B63G 8/14* (2013.01); *B63J 2003/046* (2013.01); *Y02T 70/70* (2013.01)

(58) Field of Classification Search
CPC . B63G 8/00; B63G 8/001; B63G 8/08; B63G 8/14; B63G 8/18; B63G 2008/00;
(Continued)

(56) References Cited

U.S. PATENT DOCUMENTS

| 868,798 A | * | 10/1907 | McLaughlin | ......... F03B 17/061 |
| | | | | 290/54 |
| 3,105,453 A | * | 10/1963 | Hayes | .................. B63G 8/001 |
| | | | | 114/144 B |

(Continued)

FOREIGN PATENT DOCUMENTS

CN        101405179 A       4/2009
NZ           570562 A       9/2011
(Continued)

OTHER PUBLICATIONS

Fisheries and Oceans Canada, Science in the News, Science Annual Report 2005-2006, 2006, 6 pages, Communications Branch of Fisheries and Oceans Canada, Ontario, Canada.
(Continued)

*Primary Examiner* — Daniel V Venne (57) ABSTRACT

A subsea system for exploiting an oceanic current shear includes a first vehicle positionable in a first oceanic current and tethered to a second vehicle positionable in a second oceanic current. The first and second oceanic currents have a velocity differential. A drag or lift device integral or attached to the first vehicle exerts a force through the tether on the second vehicle and its associated drag or lift device, thus providing a net propulsive force. Hydrofoils or control devices attached to the vehicles provide hydrodynamic lift, drag, and/or depth control that allow the direction of the force to be controlled for propulsion in a desired direction. The relative currents and/or change in separation of the vehicles can be used for energy harvesting. Turbines and generators coupled to the vehicles harvest energy for long term subsea endurance. A sensor aperture comprises a plurality of sensors coupled to components of the subsea system.

19 Claims, 5 Drawing Sheets

(51) Int. Cl.
*B63J 3/04* (2006.01)
*B63G 8/14* (2006.01)

(58) Field of Classification Search
CPC ........ B63G 2008/001; B63G 2008/002; B63G
2008/004; B63G 2008/08; B63G 2008/42;
B63J 2003/046; B63J 3/04; H02K
7/1823; H02K 7/1853; B65H 19/00;
B65H 19/02
USPC ....... 114/312, 313, 330, 331, 332, 337, 338;
440/6, 9, 33, 34, 49, 113
See application file for complete search history.

(56) References Cited

U.S. PATENT DOCUMENTS

| | | | | |
|---|---|---|---|---|
| 3,209,156 | A * | 9/1965 | Struble, Jr. | F03B 13/10 290/54 |
| 3,774,564 | A * | 11/1973 | Bondon | B63G 8/001 114/244 |
| 4,534,306 | A | 8/1985 | Ruffen et al. | |
| 7,028,951 | B1 | 4/2006 | Sadeck | |
| 7,371,136 | B2 * | 5/2008 | Hine | B63H 1/36 114/293 |
| 7,641,524 | B2 | 1/2010 | Hine et al. | |
| 8,043,133 | B2 * | 10/2011 | Hine | B63H 1/36 114/293 |
| 8,242,621 | B1 | 8/2012 | Tate et al. | |
| 8,287,323 | B2 | 10/2012 | Hine et al. | |
| 8,801,359 | B2 * | 8/2014 | Sherrer | F03B 3/18 415/1 |
| 8,868,798 | B1 * | 10/2014 | Marshak | G06F 3/061 710/29 |
| 8,931,727 | B2 | 1/2015 | Engblom | |
| 9,828,068 | B2 * | 11/2017 | Bowen | B63B 21/20 |
| 2007/0051292 | A1 * | 3/2007 | Kilbourn | B63B 35/00 114/311 |
| 2007/0173141 | A1 | 7/2007 | Hine et al. | |
| 2008/0277492 | A1 * | 11/2008 | Cannon | A01G 15/00 239/14.1 |
| 2009/0127861 | A1 * | 5/2009 | Sankrithi | F03B 13/264 290/54 |
| 2010/0237625 | A1 * | 9/2010 | Dempster | F03B 7/00 290/54 |
| 2010/0332041 | A1 * | 12/2010 | Hunt | B63B 21/50 700/287 |
| 2012/0232721 | A1 | 9/2012 | Engblom | |
| 2014/0169125 | A1 * | 6/2014 | Voisin | G01V 1/38 367/18 |

FOREIGN PATENT DOCUMENTS

| | | |
|---|---|---|
| NZ | 592743 A | 9/2011 |
| WO | WO 2007/087197 A2 | 8/2007 |
| WO | WO 2010/047534 A2 | 4/2010 |

OTHER PUBLICATIONS

Hill, Minesto Receives €5.1 Million To Develop Deep Green Tidal Kite Technology, https://cleantechnica.com/2015/12/09/minesto-receives-e5-1-million-develop-deep-green-tidal-kite-technology/, Dec. 9, 2015, 2 pages, CleanTechnica.

Holler, The Evolution of the Sonobuoy From World War II to the Cold War, U.S. Navy Journal of Underwater Acoustics, Jan. 2014, 27 pages, Naval Research Laboratory, Washington, D.C.

Royal Navy, Unmanned Warrior—Wave Gliders a New Tool for Navy Hydrographers, http://www.royalnavy.mod.uk/news-and-latest-activity/news/2016/october/06/161007-wave-gliders, Oct. 6, 2016, 4 pages, United Kingdom.

Warwick, Sky-High Ideas Unmanned technology has opened up the design space for aviation concepts, Aviation Week & Space Technology, Jul. 6-19, 2015, 1 page, Aviation Week, New York, USA.

Williams, Minesto 'Deep Green' technology rides the waves of progress, Maritime Journal, Oct. 2, 2015, 3 pages, Mercator Media Ltd, United Kingdom.

Argo, About Argo, http://www.argo.ucsd.edu/About_Argo.html, to the best of the applicant's knowledge article was available before the application filing date of Apr. 11, 2016, 2 pages, France.

Kongsberg Maritime, Autonomous Underwater Vehicle, Seaglider, https://www.km.kongsberg.com/ks/web/nokbg0240.nsf/AllWeb/EC2FF8B58CA491A4C1257B870048C78C?OpenDocument, to the best of the applicant's knowledge article was available before the application filing date of Apr. 11, 2016, 3 pages, Norway.

Para-Tech Engineering Co., Para-Tech Boat Brakes, http://www.seaanchor.com/boatbrakes.htm, to the best of the applicant's knowledge article was available before the application filing date of Apr. 11, 2016, 2 pages, PARA-TECH Engineering Co., Silt, Colorado.

Teledyne Water Quality, Monitoring Oceanographic Situations, http://www.teledynewaterquality.com/teledynewebbresearch.aspx, to the best of the applicant's knowledge article was available before the application filing date of Apr. 11, 2016, 1 page, Falmouth, Massachusetts.

* cited by examiner

SYSTEM AND METHOD FOR SUBSEA PROPULSION AND ENERGY HARVESTING USING CURRENT SHEAR

PRIOR APPLICATIONS

This application claims the benefit of U.S. Provisional Patent Application No. 62/145,186, filed Apr. 9, 2015, which is incorporated by reference in its entirety herein.

BACKGROUND

Unmanned, autonomous, or remote controlled underwater or undersea or subsea vehicles are often used for scientific research and commercial/defense applications for monitoring a variety of ocean properties and marine and marine vehicle activities, and other tasks. These vehicles typically propel themselves using either battery or fuel-powered motors or engines driving onboard propellers or jets. Some major disadvantages of these methods are the high cost of the batteries and motors, and the noise they emit, and the limited endurance of the vehicle due to the limitations on storage of energy. Thus, existing propulsion methods and devices have short-term endurance capabilities while at sea. Some other vehicle types, however, are configured to merely "drift" at sea within a particular oceanic current while the vehicle controls buoyancy—therefore consuming less energy than self-propelled vehicles. However, these "drifter" vehicles are not directionally controllable, and they also suffer from limited endurance capabilities at sea due to payload and "housekeeping" energy requirements.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

To address the shortcomings discussed above with respect to prior systems, the present disclosure seeks to present one or more vehicles with integral (to the vehicle) or separate hydrodynamic lift and/or drag devices separated from each other by a tether to exploit the differential current velocities at the two vehicles to provide controllable propulsion, energy harvesting for powering sensing payloads and hotel (e.g. navigation and communications), and for hosting sensing components over the large aperture provided by the vehicles, tether, and/or lift and drag devices (subsequently shortened to "drag device" in many instances in this patent.)

The present application discusses concepts and methods for creating Long-Endurance Ocean Sensor (LEOS) autonomous underwater vehicle platforms that provide Current Shear Exploitation using Tethers (CSET) for propulsion and energy harvesting for payload and hotel power of the vehicle.

A subsea system, in accordance with one example, is disclosed for exploiting an oceanic current shear. The system can comprise a vehicle positionable in a first oceanic current and a drag and/or lift device coupled to the vehicle by a tether. The drag device can be positionable in a second oceanic current different from the first oceanic current. The first and second oceanic currents can have a velocity differential to exploit an oceanic current shear. In practice, the drag device can exert a propulsion force on the vehicle due to the velocity differential between the drag device and the vehicle.

In some examples, the vehicle can comprise an energy extraction device or system, such as a turbine, for harvesting energy to power components onboard the vehicle. The turbine can be movable by hydrodynamic fluid flow forces created about and relative to the vehicle due to the vehicle's propulsion through the first oceanic current. For example, water flow about the vehicle as the vehicle is propelled can create usable hydrodynamic forces that can be harvested and converted to usable energy.

In some examples, the vehicle can include a relatively large tether aperture exposed to the ocean. The tether aperture can have attached sensors for collecting data and/or can have attached hydrodynamic flow energy harvesting devices for powering components onboard the vehicle. In some examples, the system includes a sensor aperture array having a plurality of sensors (forming a sensor aperture) coupled to the vehicle, the tether, and the drag device for collecting data.

A subsea system, in accordance with another example, is disclosed for exploiting an oceanic current shear. The system can comprise a first vehicle positionable in a first oceanic current and a second vehicle positionable in a second oceanic current. The second vehicle can be coupled to the first vehicle by a primary tether. The first and second oceanic currents can have a velocity differential to exploit an oceanic shear. A drag device, positionable in the first oceanic current, can be coupled to the first vehicle, such that the combination of the drag device and the first vehicle exert a propulsion force on the second vehicle due to the velocity differential.

In some examples, the first vehicle can be configured to have a first buoyancy and the second vehicle can be configured to have second buoyancy different from the first buoyancy.

In one aspect, a method is disclosed for exploiting an oceanic current shear. The method can include determining the velocity of a first oceanic current and a second oceanic current. The method can include positioning a first vehicle in the first oceanic current, the first vehicle being tethered to a drag device positionable in the first oceanic current. The method can further include positioning a second vehicle in the second oceanic current. The second vehicle can be coupled to the first underwater vehicle by a tether, such that the combination of the drag device and the first vehicle exert a propulsion force on the second vehicle due to the velocity differential. In some examples, the method includes collecting data from a sensor aperture array that includes a plurality of sensors coupled to the vehicles, the drag device, and the tether.

Figure 1:
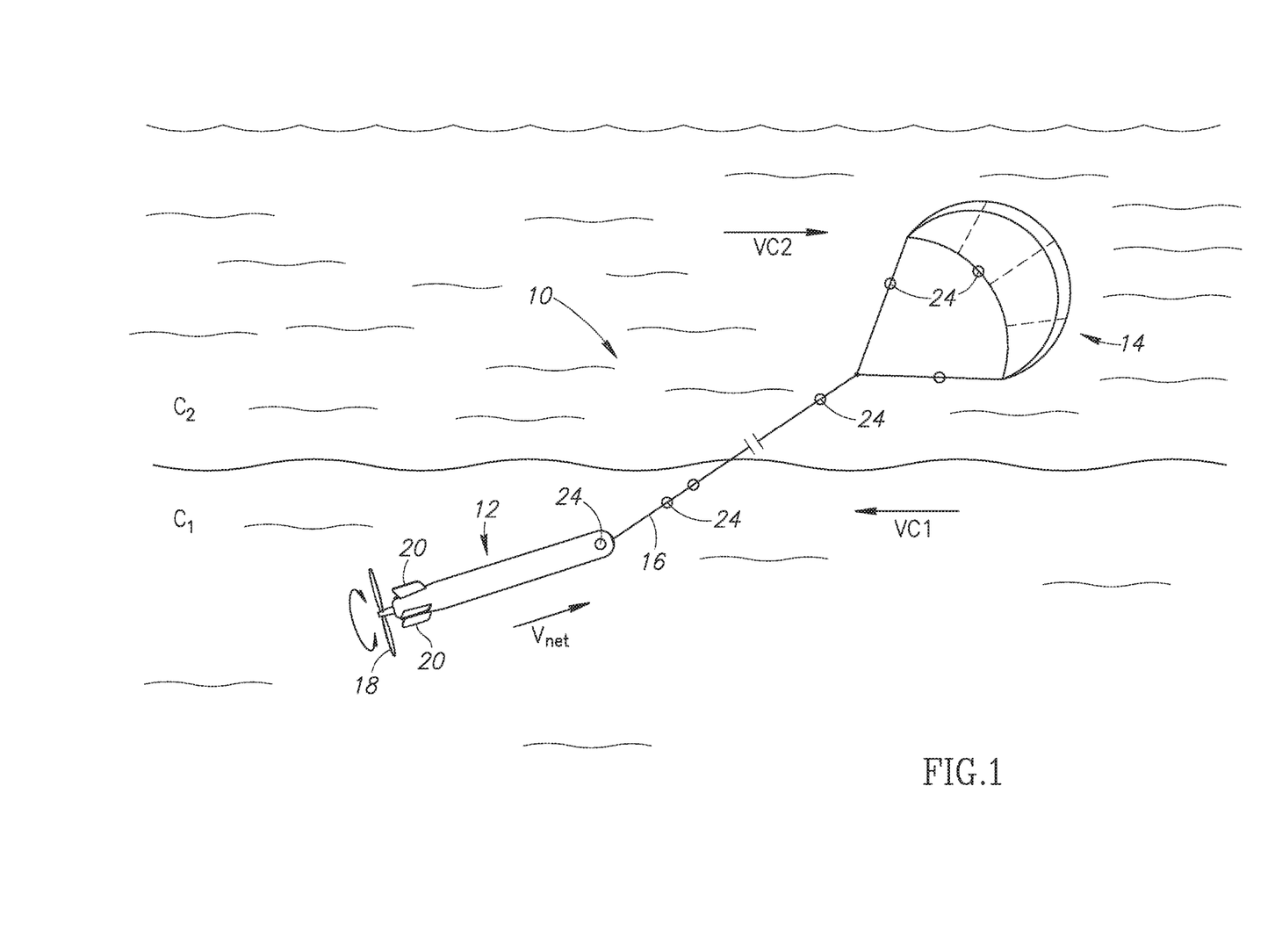
FIG. 1 is a subsea system for exploiting an oceanic current shear in accordance with an example of the present invention.

FIG. 1 shows a subsea system 10 for exploiting an oceanic current shear, in accordance with an example. The system can include a vehicle 12 positionable in a first oceanic current C1 and a drag device 14 coupled to the vehicle 12 by a tether 16. The drag device 14 can be positionable in a second oceanic current C2. The drag device can be at least one of rigid or flexible, and can be configured as one of a kite, sail, sea anchor, drogue, vane, foil, or drift sock, or a combination of these.

For purposes of this example, the first oceanic current C1 can have a velocity VC1 in the direction shown, and the second oceanic current C2 can have a velocity VC2 in a different direction, as shown. This velocity differential exploits an oceanic current shear for propulsion, sensing along an aperture, and/or energy harvesting. Consequently, the drag device 14 exerts a propulsion force on the vehicle 12, causing the vehicle 12 to move through the oceanic current C1. Thus, the net velocity $V_{net}$ of the system 10 can be of a certain magnitude, and in the direction shown, while hydrodynamic flow around the vehicle 12 has a particular net velocity $V_{net}$ as the vehicle 12 is pulled by the drag device 14. The drawings of the present application show simplified examples of ocean current magnitudes and velocities (e.g. ocean current vectors), such as those showing currents in opposite directions. Those skilled in the art will recognize that this is for illustration purposes only, and that it is to be appreciated that ocean current velocity fields or vectors can vary in both magnitude and direction with depth and position or location, with changing conditions, as a result of other factors that can affect oceanic currents.

In some examples, the vehicle 12 can comprise a turbine 18 for harvesting energy (hydrodynamic flow of the surrounding fluid) to power components onboard the vehicle 12 (see discussion below, and FIG. 4). In one example, the turbine 18 can comprise an externally mounted turbine, and can be caused to rotate by hydrodynamic forces about the vehicle 12 created due to the vehicle's propulsion through the first oceanic current C1 at a net velocity $V_{net}$ in the direction shown. In another example, two counter-rotating turbines can be used with the vehicle 12 to prevent the vehicle from spinning. However, a single turbine could be used in combination with control surfaces such as a propeller/stator combination. Although an externally situated turbine is shown in the drawings, this is not intended to be limiting in any way. For example, in still another example, the system or vehicle 12 can comprise an internally supported or mounted turbine or series of turbines, and the vehicle 12 can further comprise one or more fluid inlets (and outlets) that facilitate the flow of water through a wall or housing of the vehicle 12 into and out of the interior of the vehicle 12 as the vehicle is propelled through the water in a manner so as to contact and operate the one or more turbines supported therein. In still further examples, the direction of the fluid flowing into and out of the vehicle can be controlled through a series of tubes, channels, etc. that direct the flow of fluid onto the turbine(s), and then facilitate the exiting of the fluid out of the vehicle as needed.

In some examples, the vehicle 12 can include at least one hydrofoil 20 that can impart hydrodynamic lift forces to the vehicle as it is pulled through the first oceanic current C1. The hydrofoils 20 can further enable or facilitate at least some elements of control of direction. The hydrofoils can be any size, can comprise any number, and can be positioned as desired about the vehicle (e.g., see FIGS. 2 and 4 for different configurations of hydrofoils). The hydrofoils discussed in the present application may be integral wing-like lifting surfaces, kites, parafoils, and/or sails. The combination of a drag device (e.g., sail) and such hydrofoils allows one or more vehicles to "tack up-current", as further discussed below.

The vehicle 12 and the drag device 14 can be located at specific depths and can be configured to comprise specific horizontal separations between the oceanic currents to obtain desired relative current speeds and directions. The drag associated with each can be tailored to optimize both net transit in the desired direction of travel, and relative velocity between the local water mass and the system components to allow energy harvesting for onboard power needs. In still other aspects, the vehicle 12 can comprise controllable rudders or fins to facilitate additional control of the vehicle 12, and to optimize operation of the system.

In some examples, the system 10 includes a sensor array comprised of a plurality of sensors 24 coupled to the vehicle 12, the tether 16, and the drag device 14 for collecting data. This sensor array is discussed further below. As explicitly shown in FIGS. 1-4, the various vehicles and drag devices exemplified herein are freely movable about the ocean.

Figure 2:
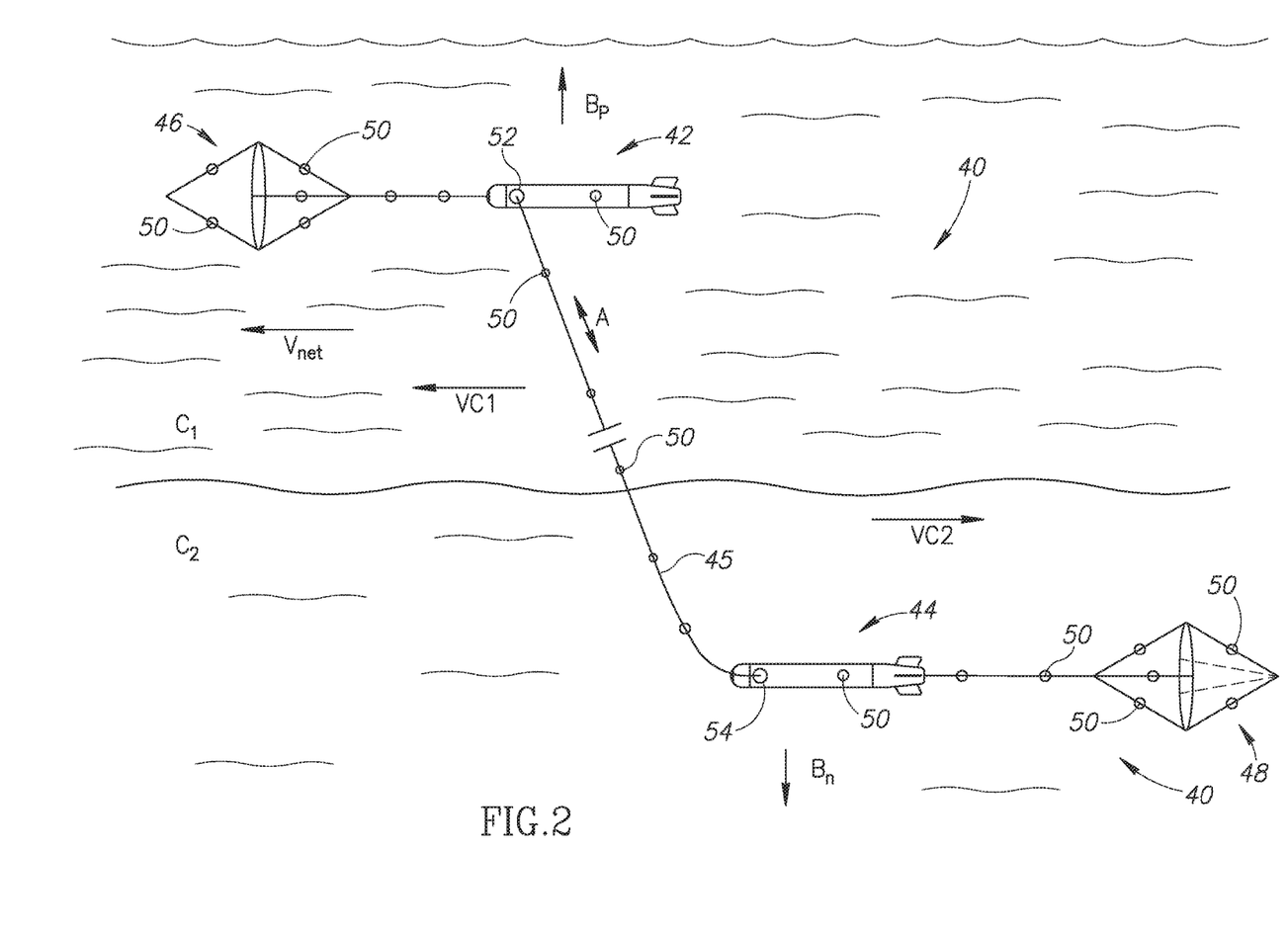
FIG. 2 is a subsea system for exploiting an oceanic current shear in accordance with another example of the present invention.

FIG. 2 shows a subsea system 40 for exploiting an oceanic current shear, in accordance with another example. The system 40 can include a first vehicle 42 positionable in a first oceanic current $C_1$, and a second vehicle 44 positionable in a second oceanic current $C_2$. The first oceanic current $C_1$ can have a velocity VC1 in the direction shown, and the second oceanic current $C_2$ can have a velocity in a different direction VC2, as shown.

The vehicles 42, 44 can be coupled together by a primary tether 45. A drag device 46 can be coupled to the first vehicle 42, such that the combination of the drag device 46 and the first vehicle 42 exert a propulsion force on the second vehicle 44 due to the velocity differential. Thus, the net velocity $V_{net}$ of the system 40 can be in the direction shown, for instance. As compared to the system of FIG. 1, system 40 of FIG. 2 has an additional degree of freedom in propulsion with the inclusion of the second vehicle 44 that facilitates "up current" motion. This is analogous to the vessel configuration and physics employed when operating a sailboat having a keel to provide hydrodynamic lift when sailing up wind. This ultimately increases the controllability of the velocity and direction of the system, and further increases the potential energy harvestable from exploiting the oceanic shear.

In ideal oceanic currents, the vehicles disclosed herein could remain undersea for dozens of years (even indefinitely, in theory) because they can continuously harvest the energy from oceanic current shear forces to power onboard components. Moreover, the disclosed subsea systems can operate in water depths where bio-fouling of the components is prevented, therefore providing even more endurance at sea. For example, the subsea system can operate in at depths below 200 meters where biofouling is minimal due to lack of sunlight.

In some examples, the first vehicle 42 can be configured to have a first buoyancy $B_p$, and the second vehicle 44 can be configured to have second buoyancy $B_n$ different from the first buoyancy. Pumps, oil bladders, and/or compressed air could be used to achieve this result (see description of FIG. 4). Methods of controlling buoyancy in such underwater vehicles is well known and as such, is not described in detail. Nonetheless, those skilled in the art will recognize that the vehicles of the subsea systems discussed herein can be configured to comprise different buoyancy properties, some of which may be fixed or variable. By controlling the buoyancy of vehicles 42, 44, the vehicles can be positioned farther away from each other, which optimizes the position of each vehicle in their respective oceanic current. This further provides optimized control over the vehicles and further increases water flow around the second vehicle 44 for energy harvesting and sensing along a sensor aperture.

The subsea system 40 can further include a plurality of sensors 50 coupled to or otherwise supported about or with/within the drag devices, tethers, and/or vehicles in order to collect a variety of information, perform measurements, etc. The plurality of sensors 50 can define or form a sensor array of the system 40, which in many cases can be quite large as a result of them spanning between the vehicles and/or the drag devices coupled to the vehicles, or other components of the system. For example, oceanic data and the vehicle(s) position, velocity, direction, and other pertinent data pertaining to the subsea system represents just some of the information that can be collected. Example sensors can include, but are not limited to acoustic, temperature, chemical, pressure, velocity, nuclear, biological, and E- or B-field sensors. These sensors can be discrete "point" sensors communicating their outputs over electrical conductor or fiber-optic cables, or can be continuous "distributed" sensors in which the properties of a conducting or fiber-optic cable in response to the measured quantity are read out directly by a remote interrogation device at various (or all) distances along the cable. Examples of the latter type of sensing are Distributed Temperature Sensing (DTS) or Distributed Acoustic Sensing (DAS). The sensors can be powered using the onboard power systems of the vehicle(s), and they can be electrically connected to onboard processors and other electronics components.

In some examples, the tether 45 can comprise either a fixed length or it can be configured to be adjustable in length (see directional arrows A representing how the tether can be adjustable in length). Adjustability of the tether can be accomplished selectively (i.e., it can be selectively controlled by a user), or it can be controlled automatically, such as when the vehicles move relative to each other within their respective currents. In some examples, power can be transmitted through the tether 45 between vehicles, and in still other examples, the tether can comprise sensors or be comprised of sensing components.

With an adjustable tether, the subsea system 40 can include one or more drum reel generators operable with the tether and one or more vehicle 42, 44 for harvesting energy as the vehicles 42, 44 move relative to each other. For example, as the vehicles move closer together (converging vehicles), the primary tether 45 can be caused to spool around one or both of drum reel generators 52, 54 onboard each vehicle. Conversely, as the vehicles move farther from each other (diverging vehicles), the primary tether 45 can be caused to unspool from around one or both of the drum reel generators 52, 54. In either case, an onboard drum reel generator has the ability to harvest energy for powering components on one or both vehicles of the system 40. Drum reel generators typically have a spring loaded winch drum to which a tether or cable wraps around. The drum spins as the tether is pulled by a force, such as from the force exerted by the vehicle 42 that can overcome the force of the spring. As the force is reduced (i.e., as the vehicles converge), the tether is wound back onto the drum, allowing it to spin in the opposite direction. The spinning drum turns an electric generator, typically through use of a series of clutches or gears (not shown).

In some examples, the second vehicle 44 can include a supplemental drag device 48 positionable in the second oceanic current $C_2$. The supplemental drag device can be used to assist with controlling the velocity of the vehicle(s), lift of the system, etc. The drag device 46 and/or the supplemental drag device 48 may each be configured in either a constant configuration or a variable configuration. In the constant configuration, the drag devices can be made or caused to be always open (i.e., not collapsible) and, in optimal conditions, a constant force can be exerted on both drag devices to maintain their open positions. This can be achieved by providing a spring device (see spring device 102 in FIG. 4) in one or both vehicles and coupling this to the spoolable primary tether 45, such that when the vehicles are converging, the spring device 102 pulls a force on one or both of the vehicles in order to spool the primary tether within the vehicle(s). Conversely, during higher velocity differential moments where the vehicles 42, 44 are diverging, the primary tether is extending from the vehicle(s), thereby spinning one or both drum reels on the respective vehicles to harvest energy. In either converging or diverging scenario, there is some constant net force on both drag devices by virtue of movement through their respective oceanic currents, which thereby propels the vehicles to achieve controlled propulsion of the system.

In the variable configuration, the supplemental drag device 48 is configured to move between open and closed positions or configurations. In a low velocity differential moment where the vehicles are converging and the primary tether 45 is being spooled, the supplemental drag device 48 will be in the open position due to a drag force by the second oceanic current. Conversely, during a higher velocity differential moment, it would be optimal for the vehicles to diverge to meet the aforementioned purposes. In order to achieve diverging vehicles in this variable configuration, the second vehicle 44 will cause the supplemental drag device 48 to close (see dashed lines), thereby reducing the drag on the second vehicle 44, which thereby causes the primary tether 45 to retract (thereby causing the vehicles to diverge). Thus, the magnitude of the velocity differential will depend on whether one or both drag devices are open or closed, which thereby assists to cause the vehicles to converge or diverge via the tether.

Controlling the configuration (i.e., opening and/or closing of the drag device) of the drag device can be achieved in a variety of ways, such as by a system of control lines, rings, etc., as will be apparent to those skilled in the art. In this variable configuration, controlling the configuration (open or closed) of the drag device(s), as described above, can be used to assist to control the position, velocity, and direction of two tethered, long endurance vehicles for controlled undersea propulsion and energy harvesting.

Figure 3:
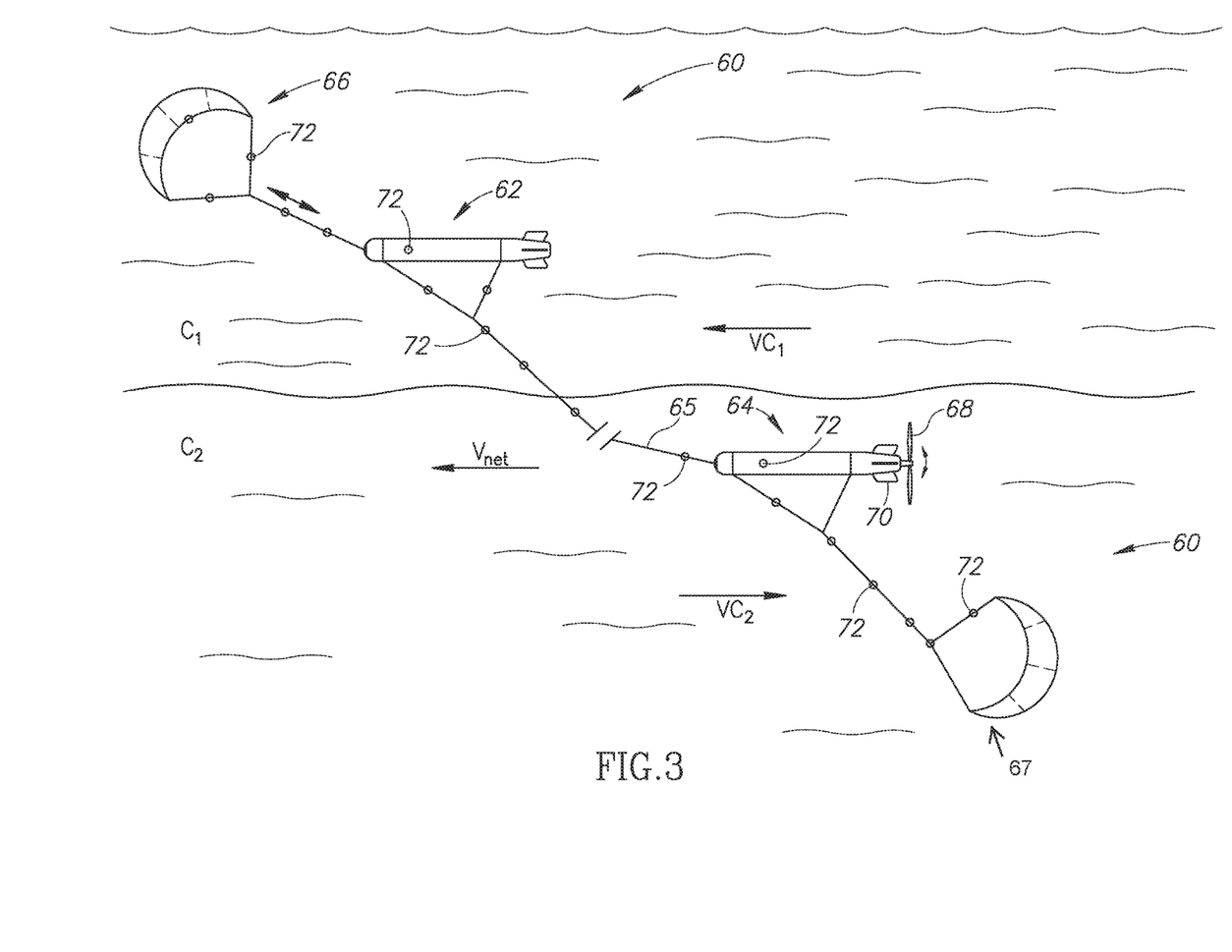
FIG. 3 is a subsea system for exploiting an oceanic current shear in accordance with still another example of the present invention.

FIG. 3 shows a subsea system 60 for exploiting an oceanic current shear, in accordance with another example. The system 60 can include a first vehicle 62 positionable in a first oceanic current $C_1$, and a second vehicle 64 positionable in a second oceanic current $C_2$. The first oceanic current $C_1$ can have a velocity $VC_1$ in the direction shown, and the second oceanic current $C_2$ can have a velocity $VC_2$ in a different direction, as shown. Similar to the description of FIG. 2, this velocity differential exploits an oceanic shear.

The vehicles 62, 64 can be coupled together by a primary tether 65. A drag device 66 can be coupled to the first vehicle 62, such that the combination of the drag device 66 and the first vehicle 62 exert a propulsion force on the second vehicle 64 due to the velocity differential. The net velocity $V_{net}$ of the system 60 would be in the direction shown, for instance. In this particular example, the drag device 66 can be configured as a sail or other type of lift device so as to further provide selective hydrodynamic lift to it and the vehicle. In other words, the drag device 66 can be configured as a hydrodynamic lifting type drag device.

The second vehicle 44 can optionally include a supplemental drag device positionable in the second oceanic current $C_2$. The purpose and function of the supplemental drag device can be similar to that discussed above in relation to FIG. 2. In one aspect, the supplemental drag device can comprise a drogue type drag device (such as the one shown in FIG. 2). In another aspect, the supplemental drag device can comprise a hydrodynamic lifting type of drag device (such as the sail type drag device 67 shown in FIG. 3). The drag device 66 and supplemental drag device 67 can each be configured in either a constant configuration or can be controllable in a variable configuration.

Figure 4:
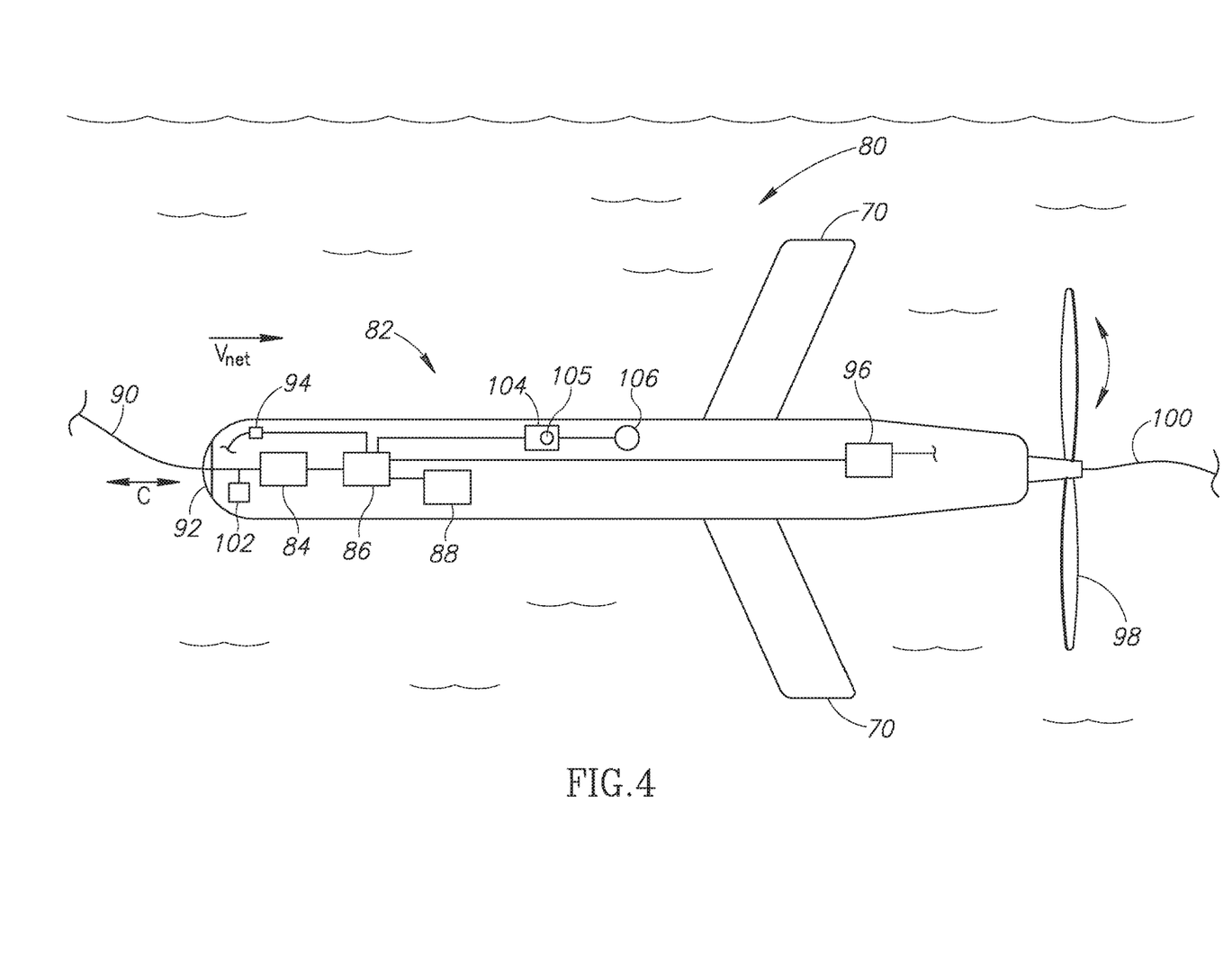
FIG. 4 is a subsea vehicle system that can be used with the examples of FIGS. 1-3 and 5.

In some examples, the tether 65 can comprise a fixed length and the second vehicle 64 can comprise a turbine 68 for harvesting energy from the surrounding water flow as the subsea system moves through the water, the energy being used, for example, to power components onboard the vehicle 64 (see FIG. 4). The turbine 68 can be caused to be rotatable by hydrodynamic forces created due to propulsion of the second vehicle 64 through the second oceanic current C2 (two counter-rotating turbines are useable). It will be appreciated that the systems of FIGS. 2 and 3 can include any combination of features and energy harvesting devices, such as a turbine, drum reel generator, and/or other energy harvesting devices that exploit hydrodynamic flow around a vehicle as it is propelled through a particular current.

In some examples, the second vehicle 64 can include at least one hydrofoil 70 that exerts hydrodynamic lift forces while being propelled through the second oceanic current $C_2$. With the drag device 67 being a sail, hydrodynamic lifting forces may be exerted on both vehicles having hydrofoils (much like the discussion regarding the analogy to sailing a boat). This configuration can provide lift to the system, and provide added functionality to the system, such as facilitating the system to "tack up-current" in optimal oceanic current conditions. Similar to the hydrofoils discussed above, this configuration can optimize control over the velocity and direction of the second vehicle 64 and can increase its flow velocity. In addition, the vehicles can include rudders and other means of controlling direction to optimize water flow velocity around the vehicle during propulsion through a particular current.

With any of the disclosed systems, if adjacent oceanic current velocities do not have a sufficient magnitude of a velocity differential to provide sufficient shear forces and resulting propulsion, the system can conserve power and choose an optimal manner to transition to an area and depth with more favorable conditions. This can be achieved by a controlled drift through management of the length of the tethers and the configuration and functional control of the drag devices (like a parasail). Alternatively, this can be achieved by mechanisms that furl sails, that change the angle of attack of the sails, and/or by changing the drag area and/or position of a particular sails or drag device. It can also be achieved in conjunction pumps or with back-up onboard powered propulsion systems to reposition the vehicles in optimal oceanic currents.

Similar to that discussed above, the system 60 can further include a sensor array that comprises a plurality of sensors 72 coupled to drag devices, tethers, and/or vehicles in order to collect a variety of oceanic data and vehicle position, velocity, direction, and other pertinent data pertaining to the system.

Any of the tethers disclosed herein could be a few meters in length up to many kilometers in length. They can be made of coaxial, single wire, or multiple wire, or even fiber optic cable for continuous sensing using one or more transmissivity or reflectometry measurement techniques that provide for near-continuous sensing opportunities. Examples include Distributed Temperature Sensing (DTS), Distributed Acoustic Sensing (DAS), or Distributed Temperature Gradient Sensing (DTGS) using Optical Time-Domain Reflectometry (OTDR), Coherent-Optical Time-Domain Reflectometry (C-OTDR), Optical Frequency-Domain Reflectometry (OFDR), or Coherent-Optical Frequency-Domain Reflectometry (C-OFDR), techniques. These techniques can exploit Raman, Brillouin, and/or Rayleigh scattering of light in the fiber to measure temperature, temperature gradients, or strain of the fiber. These effects can, in turn, be induced by the cable structure containing the fiber, or by coatings on the fiber, that are sensitive to other variables such as acoustic pressure, nuclear radiation, chemical or biological agents, or electric and magnetic fields, Therefore, the use of tethers in these undersea systems provides an advantageous opportunity to instantly and continuously (or near-continuously) gather important data across a large oceanic area.

The disclosed systems can be used to provide measurements useful for oceanographic assimilation models, such as ROM or HYCOM that use multiple measurements such as the sea surface height, surface temperature, and in situ currents, salinity, pressures, and temperatures to estimate the currents as a function of x, y, z position in the ocean. The large tether apertures are particularly valuable for this (FIG. 4). In turn, the LEOS-CSET devices can exploit the spatially-varying current estimates from these models to optimize the depths and separation of the two component vehicles (i.e., the tether length and resulting separation distance of the vehicle or vehicles) in order to exploit favorable currents and current shears to provide the desired propulsion direction, and to optimize the energy harvesting of the system.

As can be appreciated from the various examples discussed herein and shown in the drawings, the example subsea systems, including associated drag device(s) and vehicle(s) being tethered together, are untethered to the ocean bottom and untethered to the shore while the subsea system moves through the ocean.

FIG. 4 shows an example vehicle system 80 that could be employed with the systems described with reference to FIGS. 1-3 and the method of FIG. 5. The vehicle system 80 can include a vehicle 82 that can have one or more of: a drum reel generator 84, an energy storage device 86, electrical components 88 (e.g., sensors, communications), and a tether 90 disposed through a tether hole 92 on the vehicle. As discussed above with reference to the second vehicle 44 of FIG. 2, for example, the tether 90 can be spoolable around the drum reel generator 84 as the vehicle 82 moves relative to another vehicle (or a drag device), as illustrated by arrows C of the tether 90. The drum reel generator 84 can then power the energy storage device 86 and/or provide real-time power for components onboard the vehicle 82.

The tether hole 92 can be exposed to the ocean, which provides an ideal opportunity to collect data and/or harvest energy from water flow having a velocity of $V_{net}$ that enters the aperture 92. An aperture device 94 (e.g., sensors, generators, etc.) can be coupled to or near the tether aperture 92 for collecting data, harvesting power, etc.

In some examples, a generator 96 can be coupled to a turbine 98 for harvesting energy, as further discussed above. The energy can be stored in the energy storage device 86 or can be used in real-time.

In one example, a supplemental tether 100 can be included that extends from the vehicle 82. Attached to the supplemental tether 100 can be a supplemental drag device (see supplemental drag device 48 in FIG. 2, or supplemental drag device 67 in FIG. 3). In one example, as discussed above, a spring device 102 may be coupled to the primary tether 90. As discussed above with reference to FIG. 2, in the constant configuration the drag devices are always open and, in optimal conditions, a constant force can be exerted on both drag devices to maintain their open positions as the vehicles converge or diverge. In the variable configuration, one or both drag devices can be movable to the closed position(s), as further discussed in detail above.

The spring device in either or both of the vehicles can be an actual/real spring (coil, etc.) or a virtual spring (such as a battery that has harnessed energy by virtue of the vehicles diverging that is used to back-drive the generator (acting as a motor) to retract the tether when the vehicles are converging). The virtual spring energy can then be used similar to an actual/real spring (e.g., to converge the vehicles by causing a pulling force on the tether).

In some examples, the vehicle 80 can comprise a buoyancy control device that includes a pump 104 is coupled to the energy storage device 86 to control buoyancy of the vehicle 80. The pump 104 may include an internal bladder 105 coupled to an external bladder 106 for transferring oil between bladders, for example, to control buoyancy. Other known methods of controlling vehicle buoyancy may be employed in the system.

Figure 5:
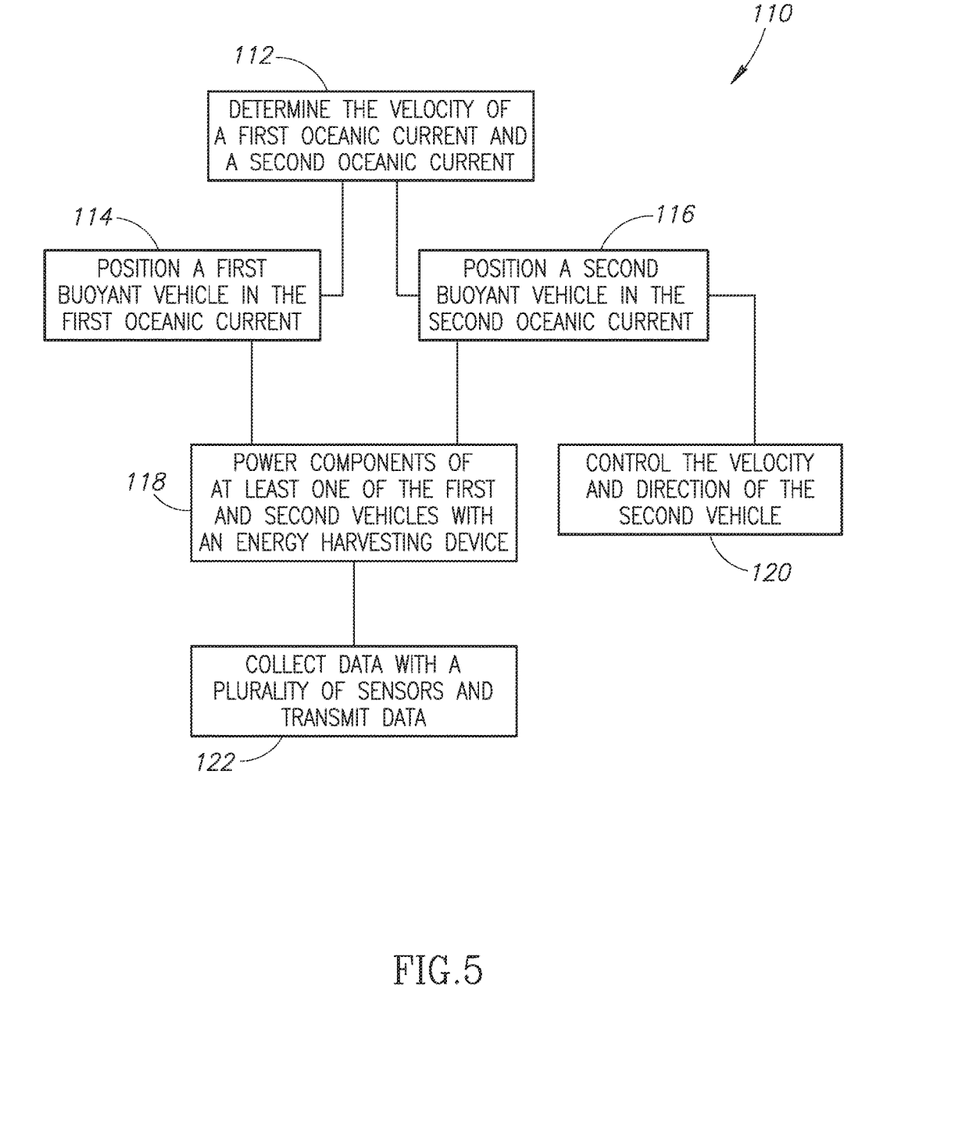
FIG. 5 is a method for exploiting an oceanic current shear in accordance with an example of the present invention.

FIG. 5 shows a schematic illustration for a method 110 of exploiting an oceanic current shear in accordance with an example of the present invention. As introduced with reference to FIGS. 2 and 3, the method includes step 112 of determining the velocity of a first oceanic current and a second oceanic current (such as with aid of Oceanographic Assimilation Models or similar models). Step 114 includes positioning a first vehicle in the first oceanic current where the first vehicle is tethered to a drag device positionable in the first oceanic current. Step 116 includes positioning a second vehicle in the second oceanic current where the second vehicle is coupled to the first underwater vehicle by a tether. Thus, the combination of the drag device and the first vehicle exert a propulsion force on the second vehicle. Step 114 can alternatively include positioning a first vehicle in the first oceanic current, with a drag device coupled thereto positioned in a second oceanic current, such as is described in FIG. 1.

Step 118 includes powering components of at least one of the first and second vehicles with an energy harvesting device on board the respective vehicle. The energy harvesting device can be a turbine onboard the vehicle and/or a drum reel generator coupled to the tether, as discussed above.

Step 120 includes controlling the velocity and direction of the second vehicle with a supplemental drag device tethered to the second vehicle (see discussion with reference to FIG. 4). This step can also be achieved with the "sailing" concept discussed above, utilizing hydrofoils and/or rudders to control direction and velocity of a propelled vehicle.

Step 122 includes collecting data with a plurality of sensors (defining a sensor array) coupled to or otherwise operable about or with/within some or all of the components of any system described in FIGS. 1-4. The data can then be transmitted by onboard communication devices to external communication systems for analysis of oceanic data, vehicle system data, and other collectable data.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various examples of the present invention can be referred to herein along with alternatives for the various components thereof. It is understood that such examples and alternatives are not to be construed as de facto equivalents of one another, but are to be considered as separate and autonomous representations of the present invention.

Furthermore, the described features, structures, or characteristics can be combined in any suitable manner in one or more examples. In the description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A subsea system for exploiting an oceanic current shear, the subsea system comprising:
    a vehicle positionable in a first oceanic current;
    a drogue coupled to the vehicle by a tether, the drogue positionable in a second oceanic current, the first and second oceanic currents having a velocity differential, whereby the drogue exploits an oceanic current sheer to exert a propulsion force on the vehicle to move the vehicle through the first oceanic current, whereby the vehicle and the drogue are untethered from the ocean bottom or the shore, and wherein the vehicle and the drogue are operable to be submerged in the ocean during exertion of the propulsion force; and
    a first sensor operable on the vehicle, and a second sensor operable on the tether, and a third sensor operable on the drogue, the first and second and third sensors defining a sensor array for collecting data.

2. The subsea system of claim 1, wherein the vehicle has a turbine for harvesting energy to power components onboard the vehicle, the turbine movable by hydrodynamic forces created due to the vehicle's propulsion through the first oceanic current.

3. The subsea system of claim 1, wherein the vehicle has a drum reel generator whereby the tether is spooled around the drum reel generator such that the drag device causes the tether to be spooled or unspooled, depending upon the magnitude of the velocity differential, to harvest energy to power components onboard the vehicle.

4. The subsea system of claim 3, wherein the vehicle includes an energy storage device whereby the drum reel generator powers the energy storage device for powering electrical components onboard the vehicle.

5. The subsea system of claim 1, wherein the first, second, and third sensors each comprise an acoustic sensor.

6. A subsea system for exploiting an oceanic current shear, the subsea system comprising:
    a first vehicle positionable in a first oceanic current and comprising a first sensor;
    a second vehicle positionable in a second oceanic current and coupled to the first vehicle by a primary tether, the first and second oceanic currents having a velocity differential, the second vehicle comprising a second sensor; and
    a drogue tethered to the first vehicle, whereby a combination of the drogue and the first vehicle exploit an oceanic current sheer to exert a propulsion force on the second vehicle to move the second vehicle through the second oceanic current, whereby the first and second vehicles and the drogue are untethered from the ocean bottom or the shore, wherein the first and second vehicles and the drogue are operable to be submerged in the ocean during exertion of the propulsion force, and wherein the tether comprises a fourth sensor and the drogue comprises a fourth sensor, and wherein the first, second, third, and fourth sensors define a sensor array for collecting data.

7. The subsea system of claim 6, wherein the second vehicle comprises a turbine for harvesting energy to power components onboard the vehicle, the turbine movable by hydrodynamic forces created due to the second vehicle's propulsion through the second oceanic current.

8. The subsea system of claim 6, wherein at least one of the first and second vehicles comprises a drum reel generator whereby the primary tether is spooled around the drum reel generator, such that the primary tether is spooled or unspooled as the first and second vehicles move relative to each other depending upon the magnitude of the velocity differential.

9. The subsea system of claim 8, wherein the drum reel generator is operative with an onboard energy storage device configured to facilitate powering of one or more vehicle components or systems.

10. The subsea system of claim 6, wherein the first vehicle and the second vehicle each have a buoyancy control device such that each vehicle is configurable to have different buoyancies.

11. The subsea system of claim 6, wherein the second vehicle is coupled to a supplemental drogue by a supplemental tether.

12. The subsea system of claim 11, wherein the first vehicle comprises a first drum reel generator and the second vehicle comprises a second drum real generator, whereby each end of the primary tether is spooled around each of the first and second drum reel generators, such that power is harvested and stored in each vehicle as the first and second vehicles move relative to each other depending on the magnitude of the velocity differential.

13. The subsea system of claim 12, wherein at least one of the first and second vehicles includes a spring device coupled to the primary tether to retract the tether depending on the magnitude of the velocity differential, thereby moving the first and second vehicles closer together, such that power is harvested and stored in each vehicle via the drum reel generators when the differential velocity between the first and second vehicles is such that the force is less than that provided by the spring device.

14. The subsea system of claim 12, wherein at least one of the drogue and the supplemental drogue is moveable between open and closed positions depending on the magnitude of the velocity differential.

15. The subsea system of claim 6, wherein at least one of the first and second vehicles includes at least one hydrofoil that exerts hydrodynamic lift forces in combination with propulsion forces exerted by the drogue.

16. A method of exploiting an oceanic current shear, the method comprising:
    determining the velocity of a first oceanic current and a second oceanic current, the first oceanic current and the second oceanic current having different velocities;
    positioning a first vehicle in the first oceanic current, the first vehicle tethered to a drogue positionable in the first oceanic current;
    positioning a second vehicle in the second oceanic current, the second vehicle coupled to the first underwater vehicle by a tether to form a subsea system that is submerged in the ocean, whereby a combination of the drogue and the first vehicle exploit an oceanic current sheer to exert a propulsion force on the second vehicle due to the velocity differential to move the second vehicle through the second oceanic current, whereby the first and second vehicles and the drogue are untethered from the ocean bottom or the shore; and collecting data via a sensor array located on the subsea system, the sensor array defined by at least one sensor on each of the first vehicle, the second vehicle, the tether, and the drogue.

17. The method of claim 16, further comprising powering components of at least one of the first and second vehicles with an energy harvesting device on board the respective vehicle.

18. The method of claim 16, further comprising controlling the velocity and direction of the second vehicle with a supplemental drogue tethered to the second vehicle, the supplemental drogue movable between open and closed positions.

19. The method of claim 16, further comprising collecting data from a plurality of sensors coupled to the drogue and the tether.

* * * * *